United States Patent [19]

Hiett et al.

[11] 4,169,166

[45] Sep. 25, 1979

[54] POTATO MASH PRODUCT AND PROCESS FOR PRODUCING SAME

[75] Inventors: Kenneth K. Hiett, Richboro, Pa.; Archie R. McFarland, Sandy, Utah

[73] Assignee: Beehive Machinery, Inc., Sandy, Utah

[21] Appl. No.: 866,242

[22] Filed: Jan. 3, 1978

[51] Int. Cl.$^2$ .............................................. A23L 1/216
[52] U.S. Cl. .................... 426/637; 426/481; 426/482
[58] Field of Search ............... 426/637, 481, 482, 615, 426/478, 480

[56] References Cited

U.S. PATENT DOCUMENTS

| | | | |
|---|---|---|---|
| 3,739,994 | 6/1973 | McFarland | 426/480 |
| 3,862,345 | 1/1975 | Westover | 426/481 |
| 3,906,118 | 9/1975 | McFarland | 426/479 |

FOREIGN PATENT DOCUMENTS 1965 of 1863 United Kingdom .................... 426/481

*Primary Examiner*—Jeanette M. Hunter
*Attorney, Agent, or Firm*—Mallinckrodt & Mallinckrodt

[57] ABSTRACT

Cooked potato pieces containing the skins, eyes, and hard defective flesh portions of the whole potatoes from which such pieces are prepared are fed into one end of a perforated conduit having perforations that are only large enough to pass the potato flesh, and are transported along the length of such conduit by a conveyor screw while pressure is exerted sufficient to pass only the potato flesh through the perforations, with minimal, if any, damage to the cells thereof. Potato mash substantially free of skins, eyes, and hard defective flesh portions is collected from the outer face of the conduit as the principal product of the process, while the rejected potato skins, eyes, and hard defective flesh portions are discharged at the opposite end of the conduit as a by-product useful for animal feed or otherwise.

8 Claims, No Drawings

POTATO MASH PRODUCT AND PROCESS FOR PRODUCING SAME

BACKGROUND OF THE INVENTION

1. Field

The invention is in the field of processing potatoes for the production of a commercially useful mashed potato product.

2. State of the Art

Prior to this invention, it has been the practice in industrial plants producing mashed potato products, such as dehydrated potato flakes and granules, to follow the almost universal custom in households of peeling the raw potatoes prior to cooking and mashing them. From an industrial standpoint, raw potatoes are normally peeled by subjection to an alkali wash or steam treatment followed by tumbling in equipment that abrades the skins or by a high pressure spray that dislodges the skins. It is virtually impossible, however, to remove deep-seated eye portions or hard defective portions of the potato flesh in this manner without removing a considerable quantity of the potato flesh. Accordingly, it has been customary to remove remaining eye portions and defects by hand, following peeling of the potatoes but prior to cooking and mashing them.

SUMMARY OF THE INVENTION

In the making of the present invention, it was an object to do away with the necessity of peeling and hand-trimming potatoes prior to the mashing operation, and yet to produce a potato mash so free of skin, eyes, and hard defective flesh material that it could be used as a commercial mashed potato food product, either in dehydrated condition or otherwise.

In accordance with the invention, cooked potato pieces containing the skins, eyes, and hard defective flesh portions of the whole potatoes, whether the raw potatoes are cut into pieces after washing and then cooked or are cooked after washing but before cutting into pieces, are fed into one end of and are pressed through the perforations of a perforated conduit so that substantially only the soft potato flesh passes through, with minimal, if any, damage to the cells of such flesh. A potato mash product, substantially free of anything but the soft potato flesh, is collected from the outer face of the perforated conduit and a by-product useful as an animal feed or otherwise is collected at the opposite end of the conduit.

The size of the perforations and the pressure applied to the cooked potato pieces are the determining factors. Generally speaking, the larger the perforations, the less pressure that can be employed, and vice versa. Both the variety of potato and the extent of cooking will have some bearing on the perforation size and the degree of pressure employed, so consideration of these factors is called for in selection of the apparatus to be utilized and in the carrying out of the process therein.

It is preferred that the cooked potato pieces be passed through the interior of the conduit from one end to the other by means of a compression-type screw conveyor. As such, pressure is preferably regulated by a valve at the discharge end of an imperforate extension of such cylindrical tube, within which imperforate extension the skin, eyes, the hard defective flesh portions are compressed prior to discharge as the animal feed by-product. Pressure may also be regulated by varying screw conveyor speed and by pumping the cooked potato pieces into the conduit at a selected pressure, all to the end that rate of discharge at the discharge end of the conduit is less than the transportation rate of material along the length of the conduit. The soft potato flesh that passes through the perforations is collected from the outside surface of the cylindrical tube as a potato mash product substantially free of skin, eyes, and hard defective flesh portions of the whole potatoes subjected to processing in accordance with the invention and having a unique potato flavor, stronger than usual for mashed potatoes and somewhat resembling baked potatoes. The product has a fine texture, as is desirable for mashed potatoes, and is strongly cohesive when extruded in the forming of simulated french fries or the like.

The best mode presently contemplated for carrying out the process is by use of apparatus corresponding to that disclosed by U.S. Pat. No. 3,739,994 issued June 19, 1973, and entitled "Apparatus for Producing De-Boned Meat Products," wherein the perforations are of a size (and the pressure employed is) determined by pilot runs on the particular cooked potato pieces to be processed utilizing respective conduits having different sizes of perforations within a suitable range of sizes and utilizing different pressures within such perforated conduits. As previously indicated, pressures can be easily varied in the apparatus by adjusting the discharge valve governing size of the outlet from the perforated conduit, by varying the speed of the conveyor screw, and/or by varying feed pressures.

DETAILED DESCRIPTION OF BEST MODE

The best mode presently contemplated of carrying out the process is to slice raw potatoes following washing thereof to remove dirt and soil, but without the usual peeling and hand-trimming to remove eyes and hard defective flesh portions, and to then cook the raw slices.

Washing of the raw potatoes is preferably accomplished by use of one or more high pressure sprays of water, and cooking by subjecting the raw, unpeeled and untrimmed slices to a 160° F. water bath for a period of about twenty minutes, followed by cooling (as by the use of tap water) for a further period of about twenty minutes, and by then subjecting the cooled, partially cooked slices to steam at atmospheric pressure for from thirty to forty-five minutes.

The fully cooked slices of potato are then fed into a machine of the type shown and described in my afore-referred-to U.S. Pat. No. 3,739,994, whose compression-type conveyor screw preferably has flights that are somewhat concave in the forward direction so as to overhang the working faces thereof and thereby have a tendency to retain particles of skin, eyes, and hard defective material near the axis of the screw. During conveyance within the perforated conduit of the machine, pressure is exerted on the conveyed material toward the perforate walls of the conduit, it being possible to vary the pressure as desired by adjustment of the ring valve at the discharge end of the machine and by varying pump pressure if a pump is utilized to feed the potato slices into the perforated conduit, as is preferred. It is also preferred to use a variable speed motor for driving the conveyor screw. Pressure within the conduit can then be varied by adjusting one or more of the variables, so that the rate of discharge from the discharge end of the perforated conduit is less, to a greater or lesser extent, than the transportation rate of the material from feed end to discharge end of such conduit.

It has been found that three bands of perforations, equal in band width and having perforations 0.075, 0.060, and 0.040 of an inch in diameter, respectively, considered from feed end to discharge end, will give satisfactory results in most instances.

The so-obtained potato mash is collected from the outside of the perforated cylinder as a commercial mashed potato product, and the compressed skin fragments, eyes, and any hard defective flesh portions present in the potatoes undergoing processing are discharged through the pressure-control valve as a by-product.

Other types of machines within the broad purview of the teachings herein may be employed for carrying out the process, although processing the cooked potato pieces by passage through the machine of my afore-referred-to patent has definite advantages.

Because substantially none of the relatively soft and edible potato flesh of the whole potatoes is lost and possibly because there is pressure exerted against the skin and eyes of such potatoes during the processing in intimate association with the potato flesh portions to be recovered, particularly as carried out in the machine of my afore-referred-to patent, it has been found that the potato mash product of the invention has a stronger and superior potato flavor than potato mash heretofore obtained as well as a fine texture. Moreover, the yield is greater than from other processes, so there is an economic advantage that is also obtained.

For handling as a commercial product, it is preferred to dry the wet potato mash collected from the machine, as, for example, by passing such wet mash through drying rollers to produce flakes or granules which can be easily packaged and reconstituted at the point of use, for example, in the production of snack foods or as ordinary mashed potatoes for home and institutional consumption. The superior texture and cohesiveness of the wet potato mash makes it especially useful as the potato constituent of a prepared mix for extrusion in the production of simulated french fries and the like.

Whereas this invention is here described in detail with respect to the best mode presently contemplated of carrying it out, it should be understood that a variety of other procedures can be employed in specific instances without departing from the teachings hereof as defined by the claims that follow.

We claim:

1. A process for producing a potato mash product having substantially undamaged potato flesh cells and substantially free of skin, eyes, and hard defective flesh portions from cooked, unpeeled potatoes, comprising continuously feeding cooked, unpeeled, potato pieces into one end of a perforated conduit, the perforations of said conduit being of size which will normally prevent passage of potato skin, eyes, and hard defective flesh portions therethrough; transporting said potato pieces and debris therefrom along the length of said conduit by a conveyor screw substantially coaxial with said conduit; exerting pressure on said potato pieces and debris therefrom as the same are transported along the length of said conduit; discharging potato flesh substantially free of skin, eyes, and hard defective flesh portions through said perforations of the conduit by reason of said pressure; and discharging the skin, eyes, and hard defective flesh portions at the opposite end of said conduit by reason of the operation of said conveyor screw, said pressure being exerted by maintaining the rate of discharge from the discharge end of the conduit less than the transportation rate from feed end to discharge end of the conduit.

2. A process in accordance with claim 1, wherein the perforated conduit has an imperforate extension at its opposite end and a variable discharge valve at the discharge end of said imperforate extension, whereby pressure within said conduit can be varied and the skins, eyes, and hard defective flesh portions are compressed within said imperforate extension; and wherein pressure within said conduit and the imperforate extension thereof is varied as may be necessary to provide only the required pressure.

3. A process in accordance with claim 2, wherein the speed of rotation of the conveyor screw is also varied to provide only the required pressure.

4. A process in accordance with claim 3, wherein the potato pieces are fed into the perforated conduit under pumping pressure; and wherein the pumping pressure is also varied to provide only the required pressure.

5. A process in accordance with claim 1, wherein the perforations of the perforated conduit are substantially within the range of 0.040 to 0.075 of an inch in diameter.

6. A process in accordance with claim 5, wherein there is a band of perforations about 0.075 of an inch in diameter adjacent to the feed end of the perforated conduit, a band of perforations about 0.040 of an inch in diameter adjacent the discharge end of said conduit, and a band of perforations about 0.060 of an inch in diameter between the aforesaid bands.

7. A process in accordance with claim 1, wherein the perforations of the perforated conduit are substantially within the range of 0.040 to 0.075 of an inch in diameter.

8. A process in accordance with claim 1, wherein the potato pieces are cooked slices of whole raw potatoes.

* * * * *